March 23, 1943.  E. E. WALKER  2,314,469
HARROW DISK MOUNTING
Filed Sept. 28, 1942
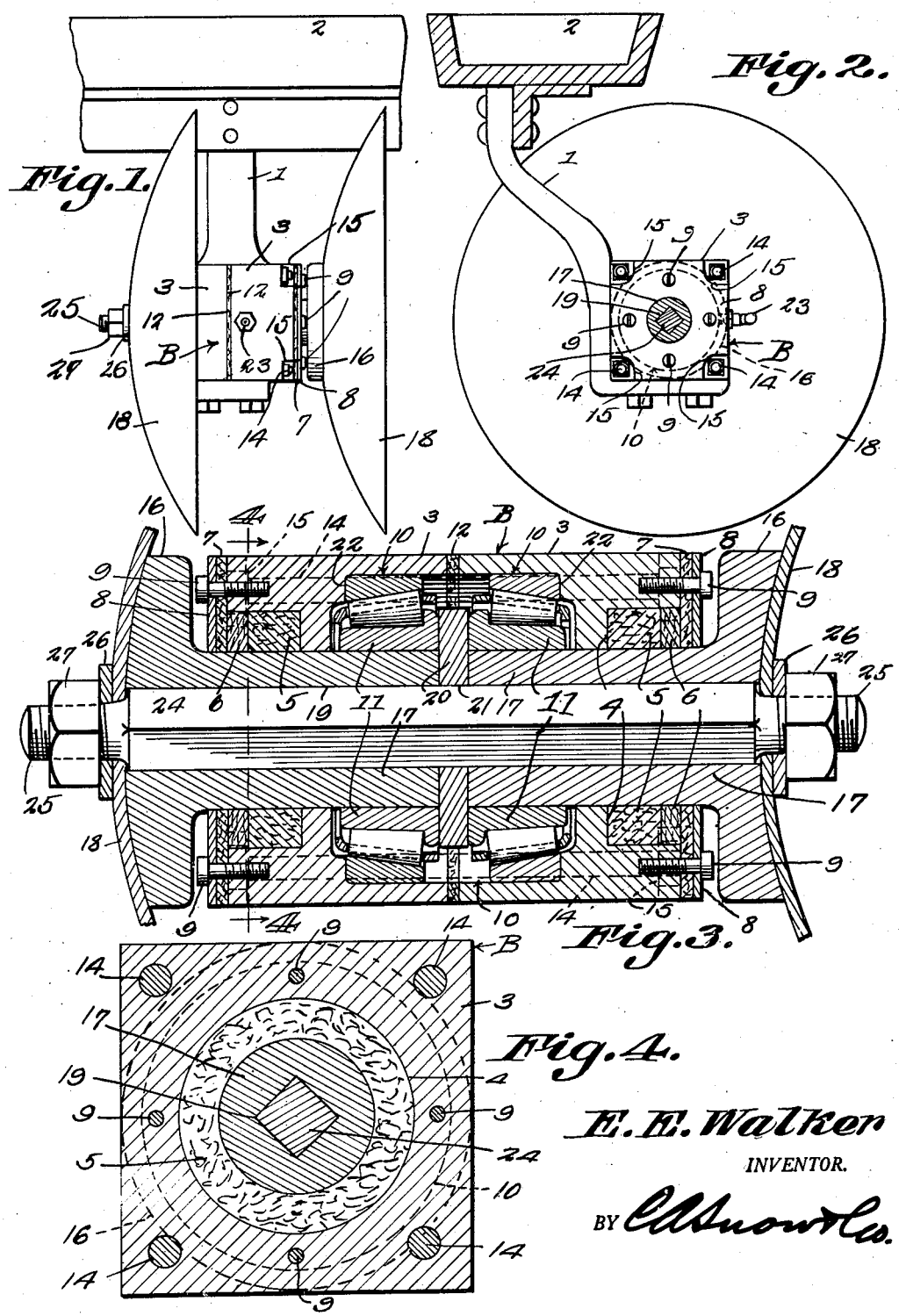
E. E. Walker
INVENTOR.

Patented Mar. 23, 1943

2,314,469

UNITED STATES PATENT OFFICE 2,314,469

HARROW DISK MOUNTING

Elbra E. Walker, Hastings, Nebr.

Application September 28, 1942, Serial No. 460,014

3 Claims. (Cl. 308—181)

This invention aims to provide novel means for supporting the disks of a cultivator, on a cultivator frame, for rotation, to provide novel means whereby lubrication will be necessary only at long intervals, and to supply novel structure whereby the foregoing, broadly stated ends may be accomplished.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Figure 1 shows, in side elevation, a device constructed in accordance with the invention, assembled with a portion of a cultivator;

Figure 2 is a cross-sectional view of the structure shown in Figure 1;

Figure 3 is an enlarged longitudinal section of the boxing and associated parts;

Figure 4 is a cross section on the line 4—4 of Figure 3.

The letter B marks, generally, the boxing which, together with associated parts, form the subject matter of this application. The boxing B is mounted by means of a bracket 1, or in any other suitable way, on the frame 2 of a cultivator.

The boxing comprises block-like members 3, which may be square in cross section. The members 3 are of like construction, and, therefore, the description will proceed in the single number.

The member 3 has a recess 4 in its outer end, the recess being circular, and receiving an inner washer 5, preferably made of felt or other absorbent material. In the recess 4 is disposed an outer washer 6 which may be absorbent also. The outer washer 6 may be made of canvas or the like, and is stiff enough so that it will put pressure on the inner washer 5.

A packing sheet 7, preferably of the same cross section as the member 3, is disposed against the end of the said member and overlaps the outer washer 6. A retaining plate 8, preferably made of metal, and of the same area as the packing sheet 7, is disposed against the packing sheet. Securing elements 9, such as screws, pass through the retainer 8 and the packing sheet 7, to hold those parts assembled with the end of the member 3.

In the inner end of the member 3 is formed a cavity 10, which receives an anti-friction bearing 11, for instance a roller bearing. A packing ring 12 is interposed between the inner ends of the members 3 of the boxing B. Corner bolts 14 or other securing elements pass through the members 3 and hold them together, pressure being put on the packing ring 12. The outer end of the member 3, the packing sheet 7 and the retainer 8 are cut away, as shown at 15, to receive the heads and the nuts of the corner bolts 14.

Tubular shafts 17 are provided, and are equipped at their outer ends with disk-like heads 16, against which cultivator disks 18 abut. The shafts 17 and the heads 16 have a polygonal bore 19. The shafts 17 extend through the retainer 8, the packing sheet 7, the outer washer 6 and the inner washer 5, the said shafts entering the cavity 10, and carrying the inner rings of the anti-friction bearings 11. Each shaft 17 has a polygonal bore 19. A spacer 20 is interposed between the inner ends of the shafts 17 and has a polygonal bore 21. The spacer 20 engages the inner rings of the bearings 11, the outer rings of the bearings being engaged by shoulders 22 formed by the cavities 10, the anti-friction bearings, thus, being held in place.

It may be noted that the cavities 10 cooperate to form a good sized reservoir for a lubricant, such as oil, and the oil may be supplied to the reservoir by an inlet fitting 23, carried by one of the members 3, and of any desired construction.

A polygonal, bolt-like connector 24 is provided, and is received in the polygonal bores 19 of the shafts 17, and in the polygonal bore 21 of the spacer 20. The connector 24 is provided with reduced ends or tips 25, passing through the cultivator disks 18, and through washers 26 and nuts 27.

The disks 18, the heads 16, the shafts 17 and the connector 24 rotate as one piece, rotation being facilitated by the anti-friction bearings 11, which are lubricated by the oil in the reservoir formed by the cavities 10. The construction is such that the structure need be lubricated but infrequently, perhaps once a season.

Having thus described the invention, what is claimed is:

1. In a harrow disk mounting, a boxing comprising members disposed end-to-end and provided at their adjacent ends with cavities cooperating to form a lubricant reservoir, the cavities defining transverse shoulders, the boxing members being supplied with recesses in their remote ends, packings in the recesses, securing means holding the boxing members together releasably, means for admitting a lubricant to the reservoir, anti-friction bearings in the cavities and comprising inner and outer rings, the outer rings engaging the shoulders, a spacer extended within the reservoir and engaging the inner rings, detachable parts mounted on the remote ends of the boxing members and overlapping the packings, shafts having polygonal bores, the shafts passing through the said detachable parts, and the packings, and entering the inner rings, the shafts abutting against opposite surfaces of the spacer, a connector of polygonal cross section removably mounted in the polygonal bores of the shafts, and disk-retaining tightening means on the connector, and, in conjunction with the spacer, holding the shafts and the connector against relative longitudinal movement.

2. In a disk harrow mounting, a boxing comprising members disposed end-to-end and provided at their adjacent ends with cavities cooperating to form a lubricant reservoir, the cavities defining transverse shoulders, securing means holding the boxing members together releasably, means for admitting a lubricant to the reservoir, anti-friction bearings in the cavities and comprising inner and outer rings, the outer rings engaging the shoulders, a spacer extended within the reservoir and engaging the inner rings, shafts having polygonal bores, the shafts entering the inner rings, the shafts abutting against opposite surfaces of the spacer, a connector of polygonal cross section removably mounted in the polygonal bores of the shafts, and disk-retaining tightening means on the connector, and, in conjunction with the spacer, holding the shafts and the connector against relative longitudinal movement.

3. In a harrow disk mounting, a boxing comprising members disposed end-to-end and provided at their adjacent ends with cavities cooperating to form a lubricant reservoir, the cavities defining transverse shoulders, securing means holding the boxing members together releasably, means for admitting a lubricant to the reservoir, anti-friction bearings in the cavities and comprising inner and outer rings, the outer rings engaging the shoulders, a spacer extended within the reservoir and engaging the inner rings, hollow shafts entering the inner rings, the shafts abutting against opposite surfaces of the spacer, a connector removably mounted in the tubular shafts, the shafts and the connector having interengaged parts connecting them for rotation together, and disk-retaining tightening means on the connector, and, in conjunction with the spacer, holding the shafts and the connector against relative longitudinal movement.

ELBRA E. WALKER.